United States Patent [19]
Colwell

[11] Patent Number: 5,877,777
[45] Date of Patent: Mar. 2, 1999

[54] FLUID DYNAMICS ANIMATION SYSTEM AND METHOD

[76] Inventor: Tyler G. Colwell, 3419 Warr Rd., South Lake Tahoe, Calif. 96150

[21] Appl. No.: 838,426

[22] Filed: Apr. 7, 1997

[51] Int. Cl.$^6$ .................................................. G06T 17/00
[52] U.S. Cl. ........................... 345/473; 345/474; 364/578
[58] Field of Search ..................................... 345/419, 302, 345/473, 474, 475; 364/578

[56] References Cited

U.S. PATENT DOCUMENTS

| | | | |
|---|---|---|---|
| 4,809,202 | 2/1989 | Wolfram | 364/578 |
| 5,239,623 | 8/1993 | Sato et al. | 345/419 |
| 5,367,614 | 11/1994 | Bisey | 345/419 |
| 5,432,718 | 7/1995 | Molvig et al. | 364/578 |
| 5,537,641 | 7/1996 | da Vitoria Lobo et al. | 345/419 |
| 5,594,671 | 1/1997 | Chen et al. | 364/578 |
| 5,606,517 | 2/1997 | Traub et al. | 364/578 |

OTHER PUBLICATIONS

*Digimation Complete 3D Software Resource*, Fall/Winter 1996 catalog, pp. 1–4.

*Primary Examiner*—Phu K. Nguyen
*Assistant Examiner*—Cliff N. Vo
*Attorney, Agent, or Firm*—Kolisch, Hartwell, Dickinson, McCormack & Heuser

[57] ABSTRACT

The described system and method provide for the creation of realistic wave fronts and spray from one or more user-defined objects impacting on or moving on the surface of a user-defined body of fluid, e.g. water, without using the Navier-Stokes equations. A novel fluid dynamics model is used which requires only the solution of a small set of simple pressure and flow equations. The model involves an array of volumetric cells each in fluid communication with plural neighboring cells, wherein the height of each at each time interval is updated to represent the surface of a fluid body, and objects therein or impact thereon are treated as one or more pressure vectors acting on a given cell in the array. The change in volume of each cell, and its corresponding change in height, is straightforwardly calculated for each unit of time, and the average height at each of the array's vertices is used to build a dynamically changing wire-frame grid that represents the surface of the fluid body. The calculations required are straightforward and involve no differentials or integrals. Instead, the calculations require simple arithmetic operations that can be performed quickly in a single iteration for each of only three equations involving pressure on a given cell and fluid communication with neighboring cells. The invented animation system provides easy-to-use tools for creation of such fluid dynamic renditions, preferably as a software plug-in module to the already capable 3D Studio MAX® animation tool kit operating under Windows® 95 or NT.

15 Claims, 10 Drawing Sheets

Spray Properties

- Properties -
- Amount: 10
- Threshold: 100
- Gravity: 50

- Size: 50
- Velocity: 50
- Stretch: 50

- Atten: 100
- D Scatter: 100
- V Scatter: 100
- S Scatter: 100

- Droplet Limit -
- Max. Active Droplets: 500
- not exceeded

- Droplet Shape -
- ○ Tetra   ⊙ Hexa   ○ Octa

FLUID DYNAMICS ANIMATION SYSTEM AND METHOD

TECHNICAL FIELD

The present invention relates generally to computerized animation systems software that permits a user to construct three-dimensional (3D) animated scenery as a series of frames using objects and backgrounds, etc. either of the user's creation or those chosen from a library of stored objects and backgrounds. More particularly, it concerns a software plug-in module for such a 3D animation tool kit that enables the user to create animations wherein fluid bodies and objects floating or impacting thereon may be realistically and straightforwardly rendered.

BACKGROUND ART

Three dimensional animation tool kits are available that provide a set of frame creation tools for animators in the fields of computer or video game, special effects and commercial advertising production. Realistic renderings are intensive in data processing, as they use some version of the well-known and complex Navier-Stokes formulae to calculate the time derivatives that are involved in conventional fluid dynamics applications. Such a conventional approach to 3D animation is disclosed in U.S. Pat. No. 5,537,641 to da Vitoria Lobo, et al. entitled 3D REALTIME FLUID ANIMATION BY NAVIER-STOKES EQUATIONS, issued Jul. 26, 1996. Depending upon the required pixel resolution and frame size, renderings of 3D fluid animation often suffers, ironically, from a lack of fluidity of motion resulting from an undesirably low frame speed, resulting in an undesirably flickering or jerky, and thus unrealistic, rendering. Increasing the processor speed, of course, or increasing the number of processors solving the Navier-Stokes in parallel may result in an adequate rendering, but at greatly increased cost.

The 3D Studio MAX® product provides a rudimentary fluid mechanics animation tool, but the tool renders only an unrealistic wave in response to a predefined warp function. Moreover, the 3D Studio MAX® product does not provide the capability to place and optionally move an object in the fluid body context and to have the two interact. It is believed that the 3D Studio MAX® product does not provide realistic fluid dynamics and object interaction because it has been assumed to this time, as taught by the above patent, that solution of the Navier-Stokes equations was required, and imposed a prohibitive processing overhead and associated cost.

DISCLOSURE OF THE INVENTION

Surprisingly, the invented system and method provide for the creation of realistic wave-fronts and spray from one or more user-defined objects impacting on or moving on the surface of a user-defined body of fluid, e.g. water, without using the Navier-Stokes equations at all. Instead, a novel fluid dynamics model is used which requires only the solution of a small set of simple pressure and flow equations. The model involves an array of volumetric cells each in fluid communication with plural neighboring cells, wherein the height of each at each time interval is updated to represent the surface of a fluid body, and objects therein or impact thereon are treated as one or more pressure vectors acting on a given cell in the array. The change in volume of each cell, and its corresponding change in height, is straightforwardly calculated for each unit of time, and the average height at each of the array's vertices is used to build a dynamically changing wire-frame grid that represents the surface of the fluid body.

Importantly, the calculations required are straightforward and involve no differentials or integrals, which are time intensive in their iterative numerical solution. Instead, the calculations per cell in the mesh include simple arithmetic operations that can be performed quickly in a single iteration for each of only three equations (equations (2) through (5), described below). The invented system and method thus rely on a conceptual simplification that nevertheless produces excellent fluid dynamic response in the surface of a body fluid in a fluid rendition that simulates the quality of motion pictures or television. The invented animation system provides very responsive, easy-to-use tools for creation of such fluid dynamic renditions, thereby greatly simplifying and accelerating the creative animation process. The invented system preferably is a software plug-in module to the already capable 3D Studio MAX® animation development tool kit operating under Windows® 95 or NT, although it will be appreciated that, within the spirit and scope of the invention, it may easily be ported to other operating systems and software platforms.

These and additional objects and advantages of the present invention will be more readily understood after consideration of the drawings and the detailed description of the preferred embodiment which follows.

DETAILED DESCRIPTION OF THE PREFERRED EMBODIMENT AND BEST MODE OF CARRYING OUT THE INVENTION

Figure 1:
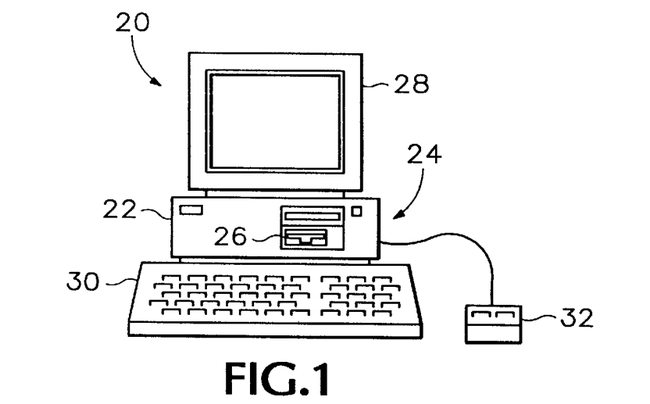
FIG. 1 is a block diagram of a typical animation system in which the invented system and method may be used.

FIG. 1 is a system block diagram of a computer environment in which the invented system and method are used. The invented system may be seen to include a computer 20, which may be an engineering workstation or other personal computer (PC) operating any desirable operating system. In the preferred embodiment of the invention, computer 20 is a PC utilizing the Windows® 95 or NT operating system and an application called 3D Studio MAX®, which provides a 3D animation development tool kit. Such an operating environment including a PC, an operating system and a rudimentary 3D animation tool will be referred to herein as an animation platform. It will be appreciated that any hardware and software platform suitably may be used.

Computer 20 preferably includes a high-speed digital processor 22 including a memory indicated generally at 24 as being within the computer's enclosure and a fixed- or removable-media disc storage unit 26; a display 28; a keyboard 30; and a cursor control device, e.g. a mouse, 32. Al such hardware is conventional, as will be appreciated by those of skill in the computer arts.

What is new is that computer 20 is executing an animation platform, e.g. a version of 3D Studio MAX®, that supports the invented system and method preferably as plug-in software. Preferably, then, computer 20 is equipped with the novel capability to permit an animator to make realistic fluid dynamic renderings that include the effect of an object such as a stone, impacting the surface of a fluid body such as a pond, as well as the effect of an object such as a boat, skimming along the surface of a fluid body such as a lake. With a few keystrokes and/or cursor controls—literally in a matter of seconds—user of the invented system and method may render an entire animated sequence that may last for minutes, replete with multiple impacts from objects, incident, reflected and interference waves, spray, wakes and the like.

The characteristics of the fluid body may be defined by the user, and may be rendered in virtually any shape and size. The fluid's viscosity effectively may be determined by the user, by the use of a variety of control bars and expressions defined within various pop-up and pull-down menus presented within sub-windows, as will be seen. Such controls include an object's surface impact or movement speed; wave speed; wave amplitude decay; and the shape, number and velocity of splash droplets. Objects may be of any user-defined shape or may be selected from a 3D Studio MAX® library as a standard geometric form. The colors of the objects and fluid body may be selected, and the objects may be illuminated as desired. The resolution of the rendering may be defined by the user. The rendering may be edited and may be freeze-frame viewed. The output format of the rendering may be specified.

Thus, the invented system and method permits a user to create photo-realistic 3D environments in which fluid surface deflections are determined by software in accordance with the simplified hydrodynamic conceptual model and equations that describe certain fluid behavior of a fluid body in response to stimuli. A user of the invented system and method defines one or more objects and their interactions with a body of fluid to create a series of still-action frames that, upon rendering, may be played back in real time to give the convincing appearance of realistic fluid wake and spray phenomenon in the form of a high-quality, animated motion picture. By virtue of the model's simplicity, the fluid animation development process is simple, intuitive and fast, whether during frame-by-frame development and editing or during animated motion picture rendering. Those of skill will appreciate that the invented system and method may be applied to real-time virtual reality, e.g. 3D games, as well as to the more sophisticated special effects development, fields of endeavor.

Figure 2:
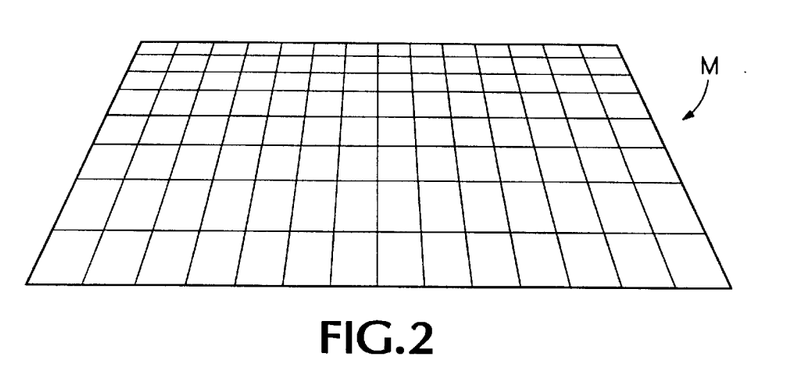
FIG. 2 is a perspective view of a two-dimensional array of cells that make up a grid that defines a fluid body's wire-frame surface.

Turning now to FIG. 2, it may be seen that a planar mesh M is shown in perspective view as being defined in the perspective sub-window in the lower right corner of a 3D Studio MAX® display screen. Mesh M will be understood to be a wire-frame planar surface that represents a two-dimensional (2D) right rectangular array of cells that represent, in turn, the surface of a fluid body being animated in accordance with the invented system and method. Five such cells are shown in more detail in FIG. 3, to be described below, to provide the basis for the conceptual model that underlies the instant invention. Those of skill in the art will appreciate that the resolution of mesh M, along the x and y axes, i.e. the number of cells along each side of mesh M, may be varied as described below to determine the resolution of the rendered fluid body impacted by an object thereon or waked by an object moving therein.

Figure 15:
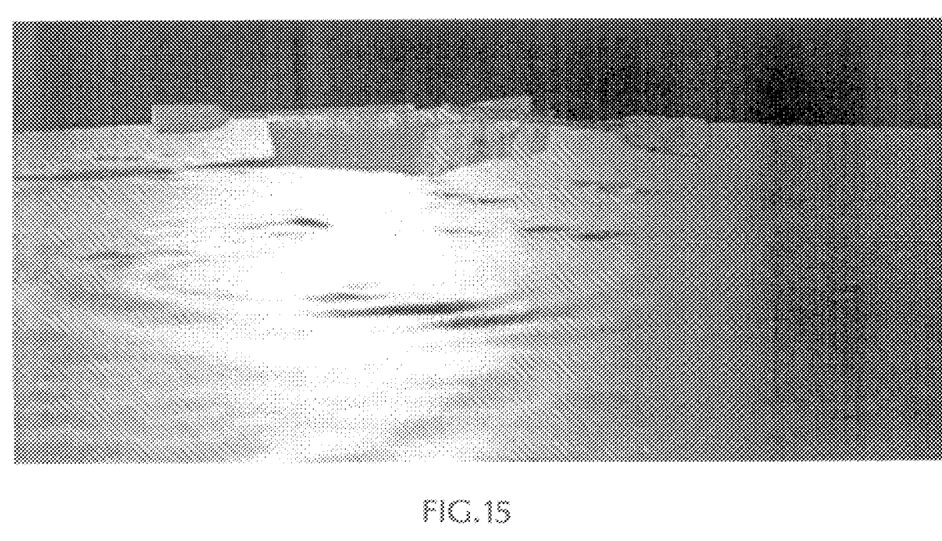
FIG. 15 is an enlarged depiction of a frame showing wake phenomena produced in accordance with invention when an object such as a rowboat travels along the surface of a fluid body such as a lake.

The concept of 'stone' is used hereinafter to describe an abstract object that impacts on or travels along the fluid body surface. During the animation process, the user specifies the attributes of a generalized, spherical 'stone' and can view its fluid dynamics interaction with a defined fluid body before the 'stone' is linked to an depicted object that impacts or wakes the fluid body surface when the animation is rendered in an apparently moving picture. Once the action of the created animation is satisfactory to the user—determined by viewing a wire-frame rendition in the Perspective viewport—the user simply links the 'stone' with a chosen or created object, and instructs the software to render the created animation. The 'stone', of course, is not visible in the rendered animation, so that an object that is linked to one or more linked 'stones' actually producing the hydrodynamic response in the fluid body appears itself to create such hydrodynamic response in the fluid body. An example that is illustrated in FIG. 15, to be described below, would be to link one or more linked wake 'stones' to the bow of a boat skimming the surface of a lake. Such an interactive animation method is outlined in more detail below by reference to FIGS. 6 through 12.

Figure 3:
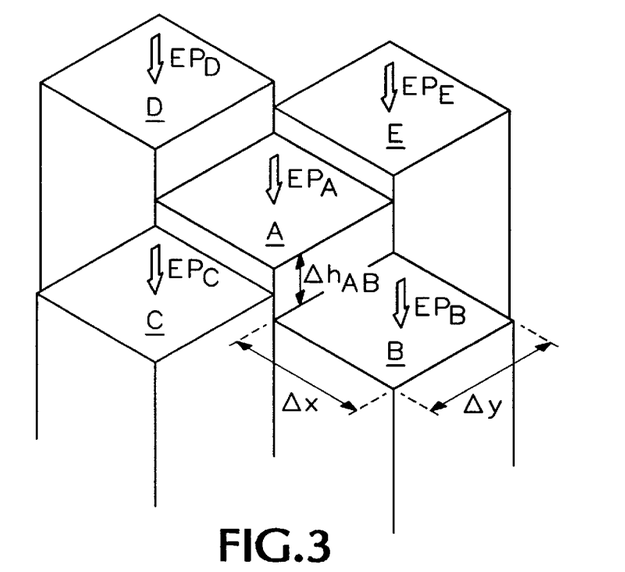
FIG. 3 is a simplified schematic diagram of the conceptual model that make the invented system and method possible.

Referring next to FIG. 3, it will be understood that the conceptual model that underlies the invented system and method may be depicted as a regular, two-dimensional (2D) array of right rectangular cylindrical cells (shown in fragmentary, isometric view in FIG. 3) having variable heights, with the cells being in right pair-wise fluid communication with one another. Those of skill in the art will appreciate that, under the influence of an outside pressure, the volume and thus height of each cell will vary, as right pair-wise cells will attempt to achieve and maintain static equilibrium represented by equal height. In other words, if the body of fluid represented by the array of cells is motionless, and under no external pressure, each right adjacent pair of cells, and thus all cells, will seek the same level by exchange of fluid thereamong. Also, if two right adjacent cells are in static disequilibrium, say, from a pressure vector acting on one of them, then the cells nevertheless over time will return to static equilibrium according to well-known hydrodynamic principles.

For the sake of simplicity in understanding the fluid dynamics model that underlies the invented system and method, five adjacent cells A, B, C, D, E of defined mesh M are depicted in FIG. 3, each being rectangular in cross section and each having a transient height at any moment in time. Associated with each right adjacent cell pair is a height difference, e.g. $\Delta h_{AB}$ which represents the difference in height between the A and B cells. Those of skill in the art will appreciate that the pressure difference between cell A and cell B is proportional to their difference in height $\Delta h_{AB}$, which pressure difference governs changes in fluid flow between cells A, B. Fluid communication between such right adjacent cell will be understood to comply with simplified hydrodynamic laws of fluid motion to be described below. In the most general case, the cells may be rectangular in cross section, as indicated by the fact that cell A is shown as having a depth $\Delta y$ and a width $\Delta x$. Singular pressure vectors per cell $EP_A$, $EP_B$, $EP_C$, $EP_D$, $EP_E$ are shown in FIG. 3 as impending downwardly normal to the planes of and in the nominal center of their corresponding cells A, B, C, D, E, F, although those of skill in the art will appreciate that typically plural ones of such pressure vectors might be acting on a cell at any given time. Such plural vectors in accordance with known vector arithmetic are summed to produce a single vector for processing in accordance with the invented formulation, as described immediately below.

Three very simple equations relate the variables within the model that include pressure and height over time for each modeled cell in the array. A first equation very simply relates the change in height of a given cell due to fluid exchange with an adjacent cell over a time interval:

$$\Delta h_{AB\Delta t} = \left[ Q_{ABt} + \frac{1}{2} \Delta Q_{AB\Delta t} \right] \frac{\Delta t}{\Delta x \Delta y}, \quad (1)$$

where $\Delta h_{AB\Delta t}$ represents the change in height of cell A due to fluid exchange with cell B over time interval $\Delta t$, where $Q_{ABt}$ represents the flow between cells A and B at time t (the beginning of time interval $\Delta t$), where $\Delta Q_{AB\Delta t}$ represents the change in flow between cells A and B over time interval $\Delta t$ and where $\Delta x \Delta y$ represents the cross-sectional area of each cell. Those of skill in the art will appreciate that the expression in the brackets represents the average flow exchange between cells A and B over time interval $\Delta t$. The unknown quantity in equation (1) is $\Delta Q_{AB\Delta t}$, which can be derived as follows.

$$\Delta Q_{AB\Delta t} = w \Delta h_{AB} \Delta t + s \Delta EP_{AB} \Delta t, \quad (2)$$

where w represents a wave speed multiplier (affected by user wave speed setting), where s represents an external pressure multiplier (affected by user-specified impact strength and wake strength settings), where $\Delta h_{AB}$ represents a difference in height between cells A and B (not to be confused with $\Delta h_{AB\Delta t}$, which is the change in height of cell A due to the fluid exchange with B over time interval $\Delta t$) and where $\Delta EP_{AB}$ represents a difference in external applied pressure between cells A and B.

Combining equations 1 and 2, it may be seen that $$\Delta h_{AB\Delta t} = \left[ Q_{ABt} + \frac{1}{2} w \Delta h_{AB} \Delta t + \frac{1}{2} s \Delta EP_{AB} \Delta t \right] \frac{\Delta t}{\Delta x \Delta y}, \quad (3)$$

so that the new height of cell A after time interval $\Delta t$ is $$h_{At+\Delta t} = h_{At} + \Delta h_{AB\Delta t} + \Delta h_{AC\Delta t} + \Delta h_{AD\Delta t} + \Delta h_{AE\Delta t}, \quad (4)$$

where $h_{At}$ is known from an immediately previous time interval calculation, where $\Delta h_{AB\Delta t} + \Delta h_{AC\Delta t} + \Delta h_{AD\Delta t} + \Delta h_{AE\Delta t}$ represent changes in the height of cell A due to fluid exchanges with all four neighboring cells B, C, D, E. These values calculated for each cell from equation (4) are then used to draw the deflected wire-frame mesh in the viewports at a given time. For the next time interval's calculations, the flow between cells A and B (for example) at the end of the current time interval, may be expressed as $$Q_{tAB+\Delta t} = Q_{ABt} + \Delta Q_{AB\Delta t}, \quad (5)$$

where $Q_{tAB+\Delta t}$ is the new flow between A and B after the present time interval. This would be used in place of $Q_{ABt}$ in equation (3) at the next time interval calculation, where $Q_{ABt}$ represents flow after the previous time interval, and where $\Delta Q_{AB\Delta t}$ represents change in flow over the present time interval. This is calculable from equation (2), above.

It will be appreciated that the vast majority of cells in a defined fluid body of any reasonable size have four neighboring, fluid-communicative cells associated with each of them, one on each side. But it will be seen that perimeter, or peripheral, cells adjacent the fluid body's boundary, which may be thought to represent land, typically have the ability to communicate with only three such neighboring cells, as the side of the rectangular cell that abuts land has no fluid-communicative capacity relative to a boundary which fully constrains the fluid at such a juncture. It may be understood then that when a fluid cell of any height is at such a boundary, it has only three effective neighboring cells with which to achieve pressure equilibrium. It is this property of the conceptual model that, as will be seen, causes waves impacting upon the edge of the fluid body, e.g. waves impinging upon land, to be reflected back into the fluid body in a simple but convincing rendition of what happens in real life.

When there are multiple sources of waves, e.g. at least one incident and one reflected wave or two or more of either, within the fluid body, a phenomenon called wave superposition, or interference, results. The conceptual model very simply accommodates this phenomenon by summing the pressure vectors affecting a given cell to obtain a resulting vector that represents the net pressure on that cell. Thus, if there are pressure vectors acting on the surface of the fluid represented by any cell, that cell will change in height commensurate with all of the pressure differentials represented by height differences in adjacent cells as well as the net pressure impinging on that cell normal to the cell's surface (e.g. from a wave-producing wake 'stone' or a wave—and perhaps spray-producing impact 'stone'). Those of skill in the art will appreciate that this very straightforward conceptual model enables an extremely efficient determination of each cell's apparent height at the end of a time slice or interval representing a frame in the animation sequence.

Figure 4:
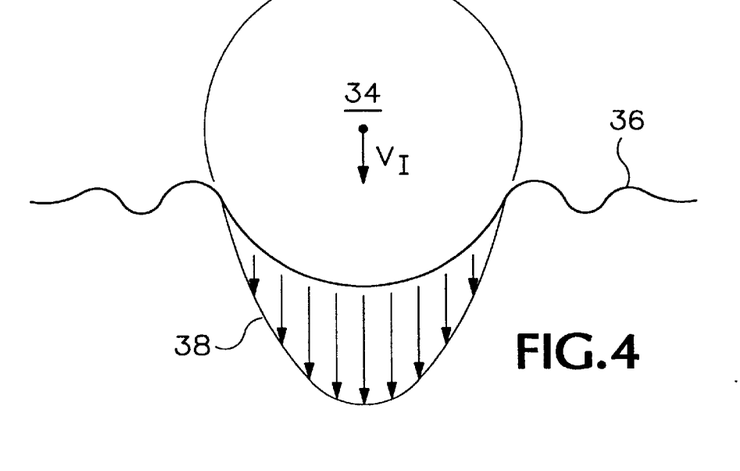
FIG. 4 is a vector diagram showing the impact generator vector profile that is used in accordance with the preferred embodiment of the invention.

Turning now to FIG. 4, the impact 'stone' pressure profile may be seen preferably to be generally sinusoidal or parabolic. An impact 'stone' 34 is shown impacting the surface of a fluid body 36 at a velocity $V_I$. The pressure profile used to animate the response of fluid body 36 to the impact of 'stone' 34 is preferably sinusoidal, as indicated schematically by a pressure vector envelope 38, and has a variable peak amplitude that may be set by the user of the invented system and method. It will also be appreciated that the peak amplitude of the pressure envelope increases with increasing impact 'stone' velocity $V_I$. In the illustration of FIG. 4, the peak amplitude of the sinusoidal impact pressure profile is greater than the depth of penetration of fluid body 36 by 'stone' 34, thus producing dramatic wave and spray phenomena, as are suggested by the amplitude of the wave front caused by the impact. Those of skill in the art will appreciate that the impact 'stone' pressure profile may, within the spirit and scope of the invention, assume any of a variety of shapes, to varying dramatic effect.

Figure 5:
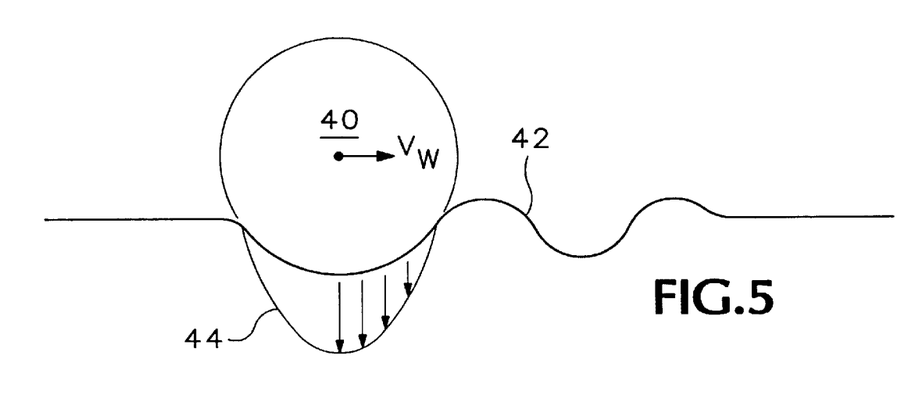
FIG. 5 is a vector diagram showing the wave generator vector profile that is used in accordance with the preferred embodiment of the invention.

Turning next to FIG. 5, the wake 'stone' pressure profile also may be seen to be preferably generally sinusoidal, with a decaying-amplitude trailing edge. A wake 'stone' 40 may be seen to be traveling from left to right in FIG. 5 through the surface plane of a fluid body 42 at a velocity $V_W$. The pressure profile is indicated as a pressure vector envelope 44 having a peak amplitude that, once again, is chosen by the user, as it is affected by wake strength and wake 'stone' velocity $V_W$. In the illustration of FIG. 5, the peak amplitude of the sinusoidal wake pressure profile is less than the depth of penetration of fluid body 42 by wake 'stone' 40, thus producing less dramatic wave and no spray phenomenon, as is suggested by the amplitude of the wave front caused by the wake. Those of skill in the art will appreciate that the wake 'stone' pressure profile may, within the spirit and scope of the invention, assume any of a variety of shapes, to varying dramatic effect.

FIGS. 6 through 12 show implementation details of the invented system and method in its preferred embodiment by way of user interface windows and sub-windows, or panels displayed on display 28. Those of skill in the art will appreciate that the operating features of the user interface enable the user to view the many options provided by the invented system and method and to choose from among them via the depression of push-buttons represented graphically on the sub-windows, e.g. by use of cursor control device 32.

Those of skill also will appreciate that the user interface is believed to be very intuitive, and intentionally follows the style of the host platform, or application program of which the invented system and method form a part, e.g. preferably 3D Studio MAX® operating in a Windows® 95 or NT environment. Within the spirit and scope of the invention, the user interface may be organized differently, providing more or less or different capabilities and more or less freedom in user-specified wave, spray, wake and other fluid dynamic phenomenon.

Figure 6:
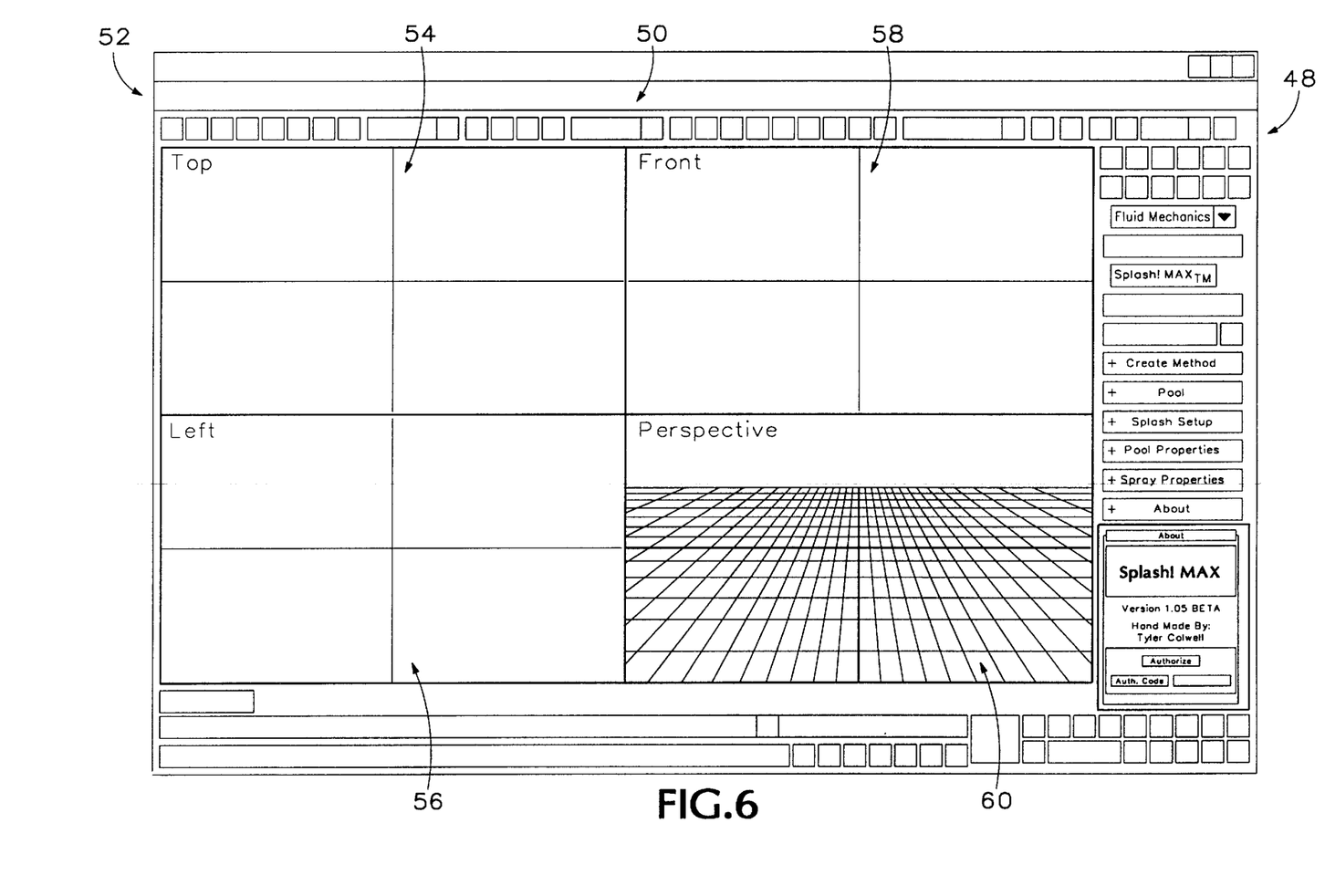
FIG. 6 is a display screen depicting a typical 3D animation window with the invented plug-in software module representing the invented system and method.

FIG. 6 represents a screen 46 (viewable on display 28 of computer 20) familiar in large part to 3D Studio MAX® users as a standard window thereinto. In a right subwindow 48 of screen 46 in FIG. 6 is an opening menu for the invented system and method, which will be understood to be implemented preferably as a software plug-in module for the 3D Studio MAX® tool kit. Thus, the Splash! MAX™ (a trademark subject to common ownership with applicant) control panel may be understood to provide an add-on software tool that greatly enhances the nominal animation capabilities of such tool kits by adding a sophisticated fluid mechanics simulation or animation tool to the user.

The opening Splash! MAX™ menu in sub-window 48 may be understood to have been invoked by choosing Fluid Mechanics from the main 3D Studio MAX® pull-down menu near the top of sub-window 48. This opening Splash! MAX™ menu provides a number of options, including Create Method, Pool, Splash Setup, Pool Properties and Spray Properties, as well as an information tool featured in detail in FIG. 6 called About, which may simply display the Splash! MAX™ logo and its manufacturer's and author's name, etc.

The icons near the top of sub-window 48 (represented in square outline) are standard 3D Studio MAX® features, and act as buttons that provide tools useful in the invented system and method, including the ability to choose from a library of standard, geometric, 3D objects such as a sphere and to illuminate such objects. The left three-fourths of the screen, indicated generally at 50, are also standard 3D Studio MAX® features, and include a toolbar 52 (with various tools represented in square and rectangular outlines) extending across the top of a field of four construction grids, or so-called viewports, 54, 56, 58, 60. These construction grid ports permit construction of 3D objects in Top, Left side, Front and Perspective view thereof, respectively.

Figure 7:
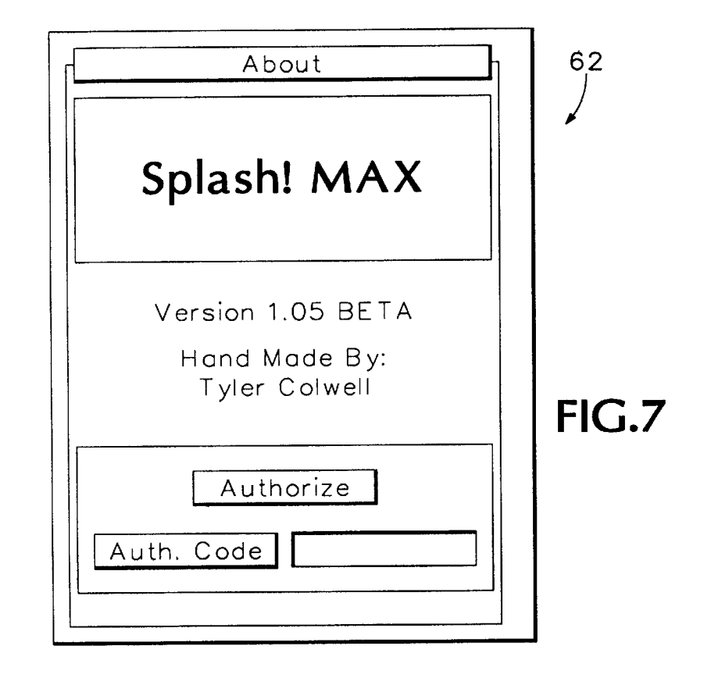
FIG. 7 is another display screen depicting one of the pull-down menus provided in accordance with a preferred embodiment of the invention.

Referring very briefly to FIG. 7, a Splash! MAX™ About sub-window 62 that forms a part of opening sub-window 48 is shown in enlarged detail, for the sake of completeness and clarity of the present disclosure.

Figure 8:
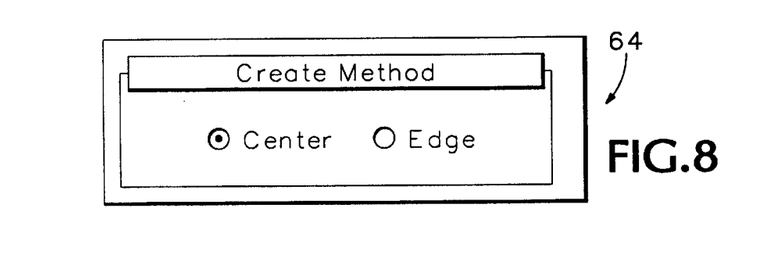
FIG. 8 is yet another display screen depicting another of the pull-down menus provided by the invention.

Referring next to FIG. 8, a Create Method sub-window 64 is shown that may be invoked by the user's selection of the corresponding button on main sub-window 48 (refer briefly back to FIG. 6). The Create Method sub-window 64 permits the user to define whether the center or edge of mesh M is affected when the mesh is created by pointing and clicking cursor control device 32 to drag, and thus to define, a mesh object within one of viewports 54, 56, 58, 60.

Figure 9:
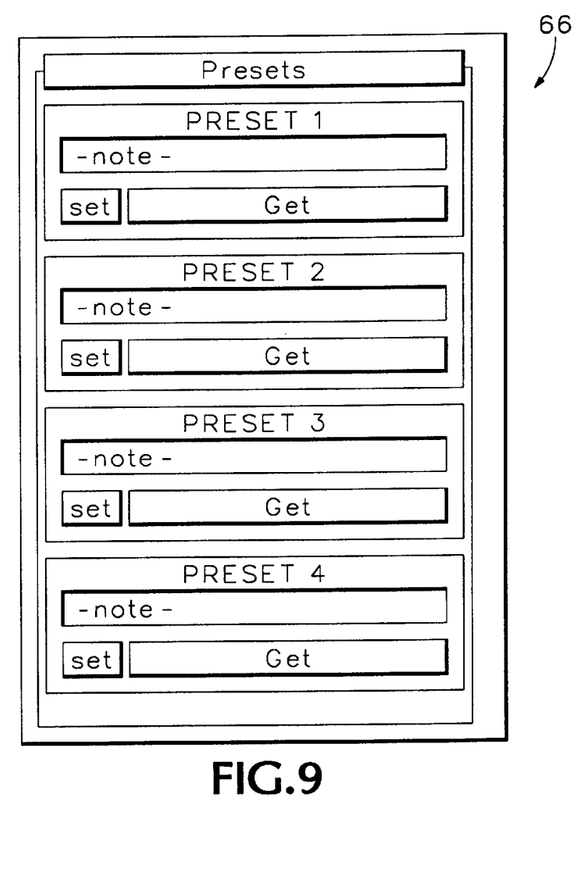
FIG. 9 is still another display screen depicting another pull-down menu provided in accordance with the preferred embodiment.

Referring now to FIG. 9, yet another sub-window 66 is shown that permits the user to define and store in memory or preferably to disc drive or storage unit certain desired preset parameters for various fluid animation processes. Presets sub-window, or panel, 66 enables the user to save their current interface settings so that they may be retrieved, without requiring reentry, later. The preset parameters preferably are saved to disc drive or storage unit 26 (see FIG. 1) so that they are available to the user in later fluid animation sessions.

Figure 10:
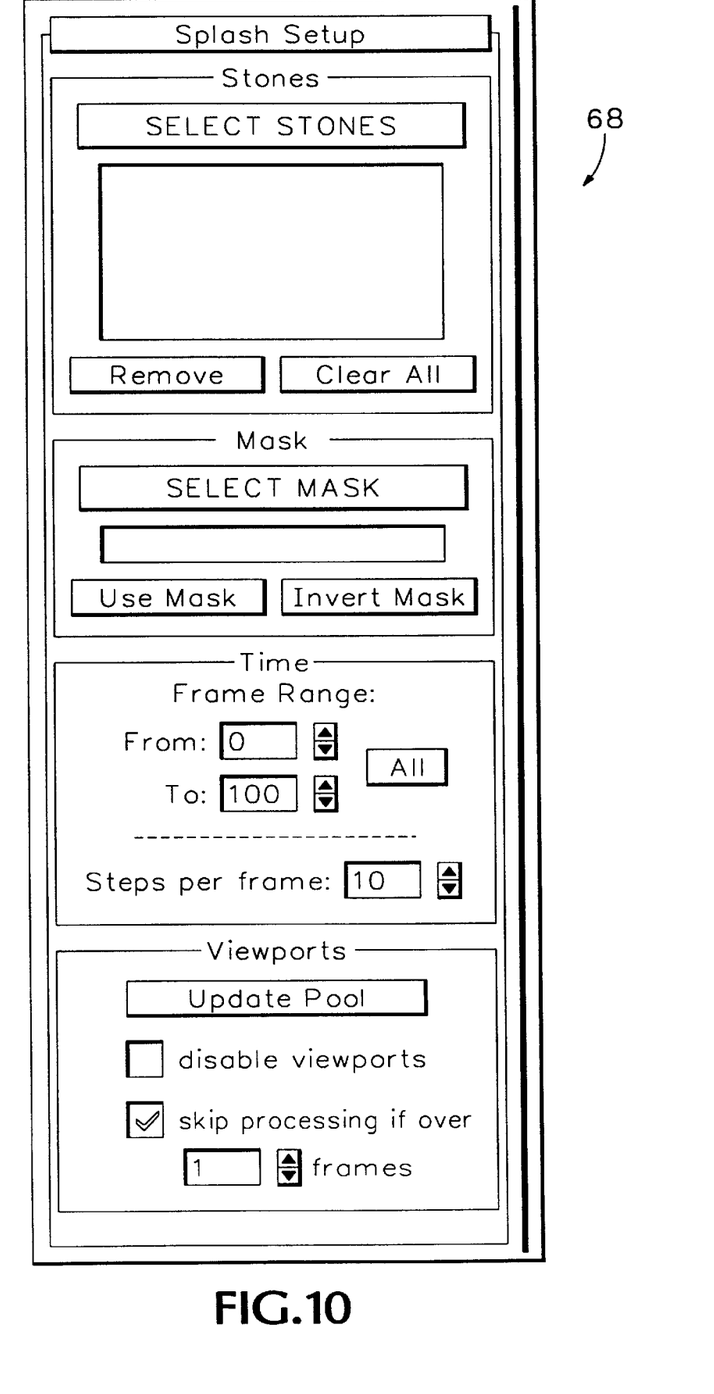
FIG. 10 is one more display screen depicting another pull-down menu provided in accordance with the preferred embodiment of the invention.

In FIG. 10, it may be seen that, when the Splash Setup button is selected from the main menu, as by the use of cursor control device 32, a new menu 68 pops up. This sub-window or panel 68 permits the user to Select or specify the Stones; to Mask a fluid body to be animated by one or more specified 'stones'; to set Time parameters such as the Range of Frame(s) for viewing and the number of Steps per frame; and to Update Pool parameters within the Viewports. The Mask feature permits free-form shaping of a fluid body for animation by defining the boundary thereof outside of which no fluid dynamics occur. Such makes for realistic renderings of ponds, lakes or bays against the shores of which waves may impinge when an object impacts on or travels across the surface of the body of water. Sub-window 68 also allows the user selectively to edit or preview an animated rendering by selecting a Frame Range, and to select the time slices, or Steps, per frame. Sub-window 68 also allows the user to Select Stones as part of the animation, as will be described in more detail below.

Figure 11:
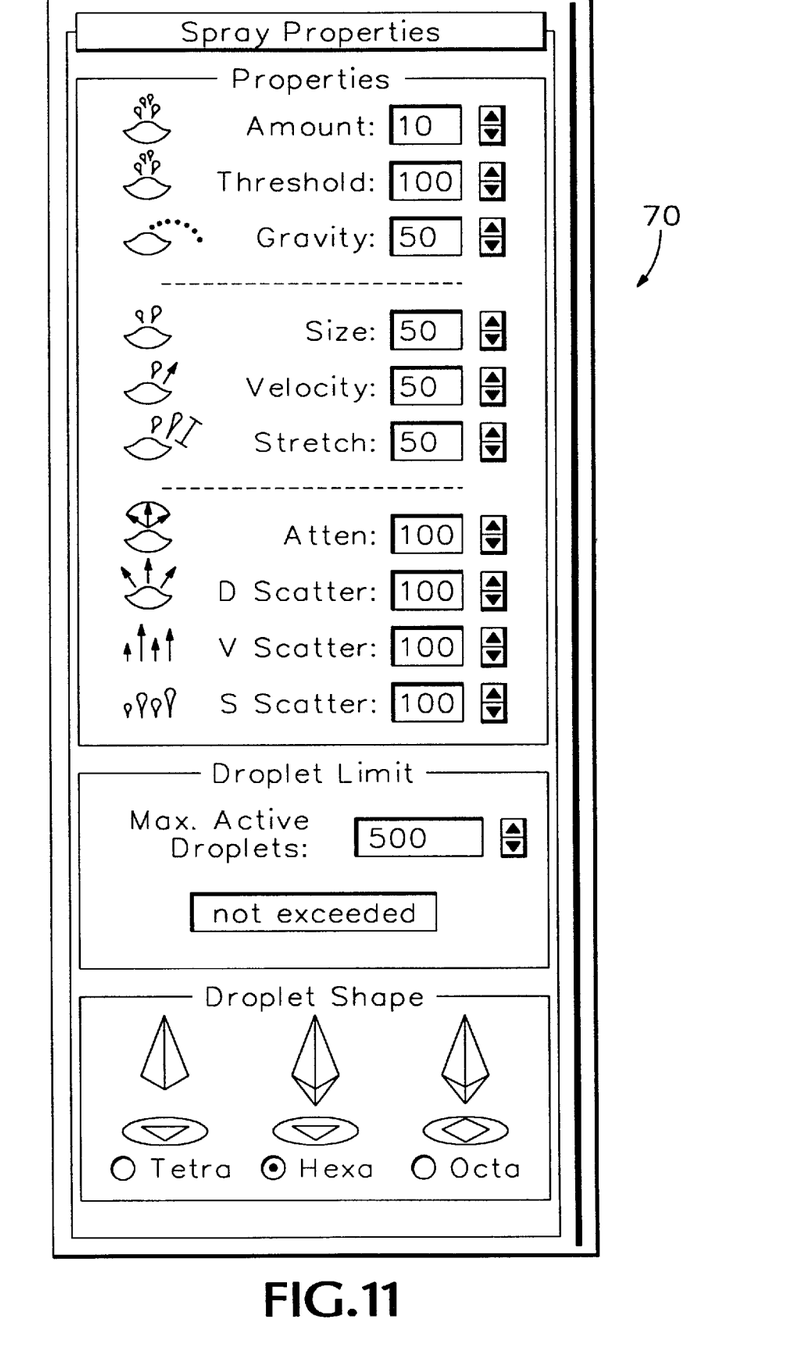
FIG. 11 is another display screen depicting a pull-down menu provided in the preferred embodiment.

FIG. 11 shows yet another pop-up menu 70 available to the user in accordance with the preferred embodiment of the invented system and method, via depression of the Spray Properties button on the main menu. It may be seen that significant control of Spray Properties also preferably is given to the user of the invented system and method, in accordance with the preferred embodiment of the invention, via depression of the Spray Properties button on the main menu to pop up sub-window or panel 70.

The user has control over the Amount, Threshold and Gravity Properties of the Spray that is produced by impact of 'stone' 34 on the surface of fluid body 36. The user also has control over the Size, birth Velocity and Stretch, or reach, of the spray. The user also preferably has control over Spray Attenuation and the Direction (D), Velocity (V) and Size of Spray Scatter. Finally, the user is given control over Droplet Limit properties of the Spray such as the Maximum (Max.) Active number of the Droplets and over the Shape of the Droplets as among tetrahedral (Tetra), hexahedral (Hexa.) and octahedral (Octa.). Such refined selection criteria provide an important element of control in animation, especially in slow-motion renderings.

Figure 12:
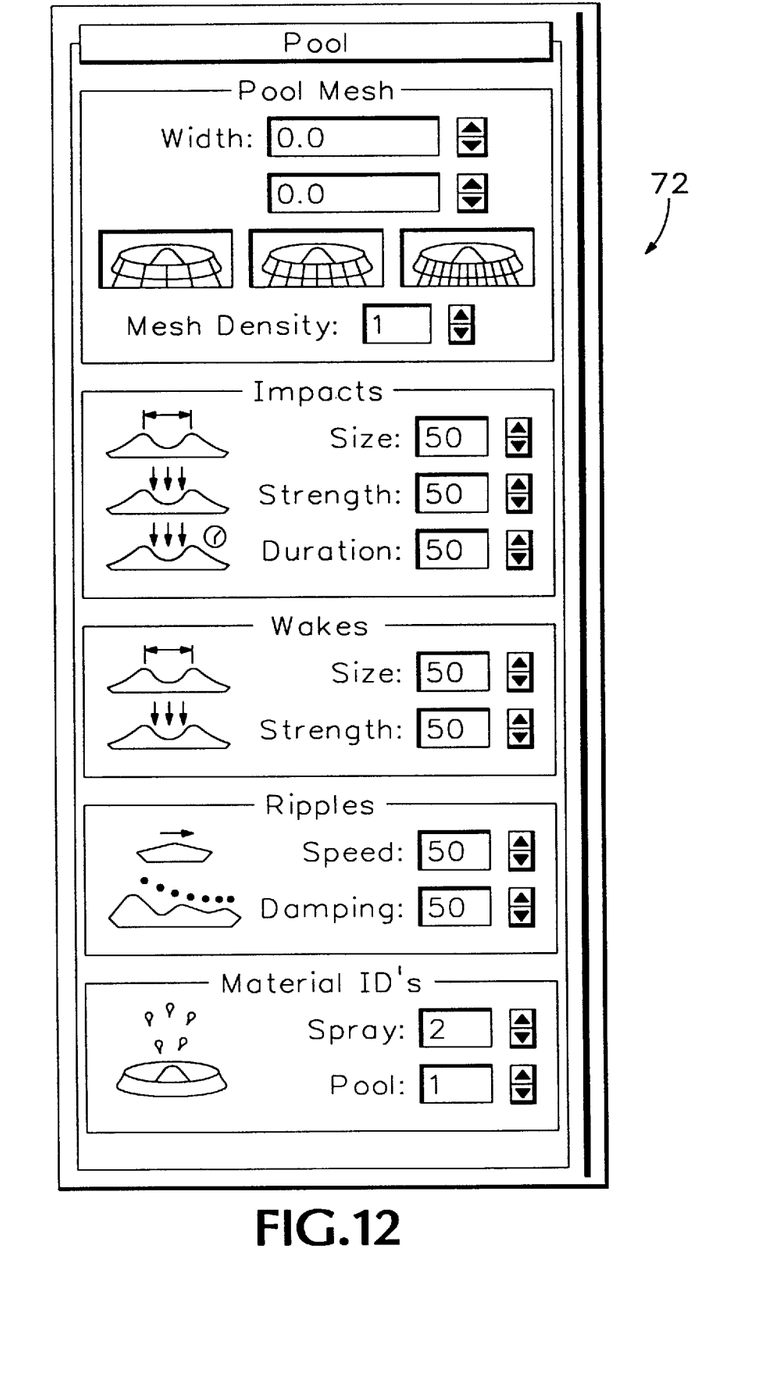
FIG. 12 is a display screen depicting another pull-down menu provided in the accordance with the invented system and method.

Turning now to FIG. 12, it may be seen that the user is provided with significant freedom to defined the fluid parameters of Pool, e.g. fluid body 36 or 42, via depression of the Pool main menu button, which pops up another sub-window or user interface panel 72. Pool Mesh Width and Density are user-selectable. Size, Strength and Duration of Impacts; Size and Strength of Wakes; Speed and Damping of Ripples; and Material ID's of both Spray and Pool all may be varied to create a desired special fluid dynamics effect, in accordance with the preferred embodiment of the invention. Material ID will be understood by those skilled in the art to permit the user to select properties of the fluid akin to viscosity may also be selected, independently for the Pool and for the Spray.

It will be appreciated that the invented system and method intentionally reserve to the user thereof a high degree of control over the fluid dynamics parameters to produce a wide variety of special effects. As a result of this freedom of control over the variables impacting on the fluid dynamic response, anomalous results are possible. For example, a phenomenon called numeric instability can occur if certain user-defined parameters are out of bounds with other parameters, and the resulting animated rendering may be undesirable.

Importantly, the invention's interactive animation methodology permits the user to view the wire-frame response of the fluid body to an impact or wake 'stone' and to modify the parameters simply by depressing a button in a sub-window to change the parameters to achieve a desirable rendering. Because the animation process is iterative, it is an important feature of the invention that the iterative steps not impose a long wait before the user sees how parameter changes affected the animation. A new wire-frame depiction of the animated fluid response may be viewed typically within seconds of each iterative parameter change, due in large part to the simplified conceptual model described herein.

Figure 13:
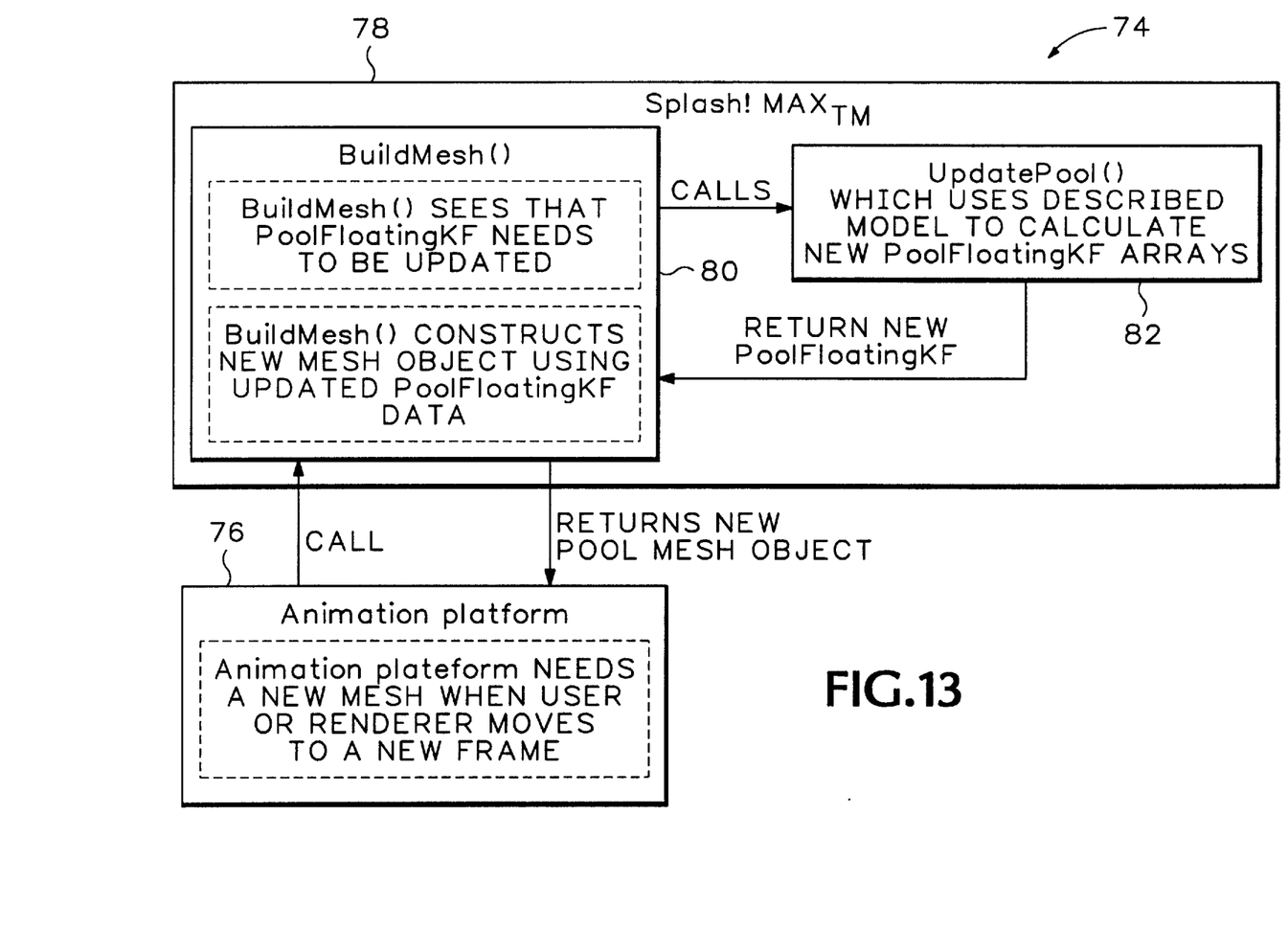
FIG. 13 is a schematic block diagram illustrating the overall computational logic of the invented system and method.

FIG. 13 is a schematic block diagram of the invented software that performs the updating of the height of cells within mesh M at each time interval. Those of skill in the programming arts will appreciate that the diagram is largely self-explanatory. Briefly, it may be seen that a functional software module called BuildMesh( ) is called by an Animation platform such as 3D Studio MAX® when the Animation platform needs a new mesh M'. Such occurs when a user of the invented software, or the invoked rendering program moves to a new frame or time interval. BuildMesh( ) determines that PoolFloatingKF needs to be updated, and calls another functional module called UpdatePool( ). UpdatePool( ) uses the conceptual model described and illustrated herein to calculate a new PoolFloatingKF array of data.

The calculated value of the new PoolFloatingKF value is returned to BuildMesh( ), as illustrated in FIG. 13, where a new mesh object is constructed using the updated PoolFloatingKF data calculated by UpdatePool( ). Such new pool mesh M' object is returned to the Animation platform and an updated mesh M'0 image is displayed to the user or provided to the rendering program. In accordance with the preferred embodiment of the invention, the code is straightforwardly written in C++. Those skilled in the art will appreciate that alternative software architectures, organizations and design and coding methodologies are possible, within the spirit and scope of the invention.

It is possible now to understand the invented system for creating an animated depiction of a fluid body's surface response to an animated depiction of an object in contact therewith as follows. The invented system preferably includes a computer-implemented hydrodynamic model including a defined wire-frame mesh M defining a two-dimensional regular array of adjacent volumetric fluid cells, with each cell being subject to external pressure from at least one neighboring cell and from an object in contact with the animated depiction of the fluid body's surface.

The invented system may also be seen to include a computational mechanism operatively coupled with the hydrodynamic model for deriving the height of each the cells in the array based upon the hydrodynamic model at predefined times, or after a time interval $\Delta t$. Finally, the invented system may be seen to include a display generator operatively coupled with the computational mechanism for creating an animated rendering of the fluid body's response to contact with the object by manipulating the mesh to represent changes in the heights of the cells at the predefined times.

The invented fluid dynamics animation method may be understood preferably to include the steps of 1) describing a fluid body as a regular array of fluid cells defined by a memory-based mathematical model, with the mathematical model describing the fluid dynamics properties representing flow between each cell and its plural adjacent cells within the array; 2) defining an object impinging upon the fluid body as a plurality of pressure vectors within a vector profile representing the impingement of the object thereon; 3) calculating the effect on the fluid body by flow between such cells within the mathematical model as influenced by the pressure vectors defining the impinging object; and 4) rendering a sequence of picture frames based upon the calculating step that, when displayed in rapid succession give the illusion of fluid motion of the fluid body and the impinging object. In this context, it will be understood that impingement on a fluid body includes impact on the surface of fluid body 36 by impact 'stone' 34 as well as travel along the surface of fluid body 42 by wake 'stone' 40, as described and illustrated herein.

Figure 14:
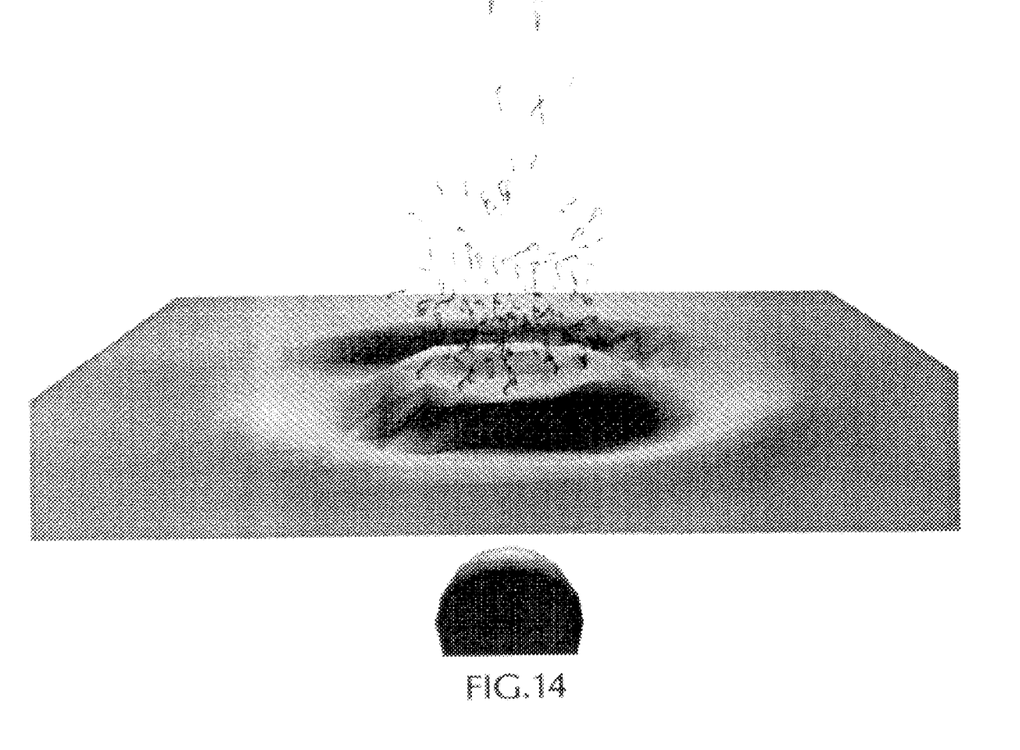
FIG. 14 is an enlarged depiction of a frame showing a plurality of waves and spray droplets generated in accordance with invention when an object such as a stone impacts the surface of a body of fluid such as a pond.

Turning now to FIG. 14, an impact 'stone' linked to a spherical object may be seen having just impacted the surface of a fluid body, e.g. water, producing a circular wave front and spray emanating from the point of impact. The object may be seen through the water near the bottom of the animation frame as it continues downwardly at user-specified velocity $V_f$. The wave front propagates realistically in the surface of the water at user-specified wake front speed $V_W$. Splash phenomena are visible in FIG. 14, the characteristics of which are in accordance with user-specified droplet number, size, shape, velocity and dispersion criteria, as described above. While the frame is illustrative of only a single snap-shot view of the hydrodynamic response of the fluid body to impact by a 'stone', nevertheless it may be appreciated that an evolving series of such frames displayed in rapid succession gives the convincing appearance of realistic, fluid motion.

Turning finally to FIG. 15, a single frame from another animated rendering in accordance with the invented system and method is shown. Depicted in this frame is a rowboat being paddled into the background, with complex and overlapping wakes from the boat's bow and the boat's oars appearing in the foreground of a body of water. Again, it will be appreciated that wake front speed, amplitude and damping coefficient are user-selectable such that the animated rendering is realistic from a fluid dynamics point of view and also aesthetically pleasing when plural ones of such frames showing progressive travel of the boat, paddling of the oars and propagation of the wakes are displayed and viewed in rapid succession.

It will be appreciated by those skilled in the arts that, in accordance with the preferred method of the invention, the calculating step includes no solution, i.e. requires no solution, to the Navier-Stokes-type equations described above as necessarily involving differentials and integrals. This is a principal object of the invention, as it leads to far more cost-effective and responsive animations. Instead, the calculating step relies preferably solely on the fluid dynamic principle of static equilibrium as between any two adjacent ones of cells within the array of cells within mesh M, as described and illustrated by reference to FIG. 3 and equations (1) through (5) above. It will be appreciated, in other words, that the describing step of the preferred method defines a mathematical model characterized by fluid dynamics properties including the change in height as between pairs of adjacent cells within the array over a given time interval $\Delta t$ as affected by the impingement of the object on the fluid body.

Preferably, the defining and calculating steps are repeated as described, with interactive input from a user of the invented method regarding the object and its impingement upon the fluid body, prior to the rendering step. In other words, a wireframe representation including a distorted, or impact or wake 'stone'-affected, fluid body 36 or 42 is built interactively as between the user and the fluid dynamics animation software—via the describing, defining and calculating steps—to produce a wire-frame representation that simulates the interaction between an object and the surface of the fluid body. It will be appreciated that the processing overhead is less with such a simplified representation and thus is much faster and thus responsive to the user.

Those skilled in the arts will appreciate then that it is the rendering step—which in accordance with the preferred system and method is performed by an Animation platform such as 3D Studio MAX® executing under Windows® 95 or NT—which produces a smooth texturing of the object and the fluid body to produce the sequence of frames characterized by realistic physical attributes in the animation such as the singular frames of FIGS. 14 and 15. Such renderings to produce convincing fluid animations will be understood to take a bit longer due to the processing overhead of handling so many pixels within the images, but generally need be done only once by the user after the user has produced and observed satisfactory wire-frame construction results.

Accordingly, while the present invention has been shown and described with reference to the foregoing preferred device and method for its use, it will be apparent to those skilled in the art that other changes in form and detail may be made therein without departing from the spirit and scope of the invention as defined in the appended claims.

I claim:

1. A system for creating an animated depiction of a fluid body's surface response to an animated depiction of an object in contact therewith, the apparatus comprising:
    a computer-implemented hydrodynamic model including a defined wire-frame mesh defining a two-dimensional regular array of adjacent volumetric fluid cells each subject to external pressure from at least one neighboring cell and from an object in contact with the animated depiction of the fluid body's surface;
    a computational mechanism operatively coupled with said hydrodynamic model for deriving the height of each of said cells in said array based upon said hydrodynamic model at predefined times; and
    a display generator operatively coupled with said computational mechanism for creating an animated rendering of the fluid body's response to contact with the object by manipulating said mesh to represent changes in the heights of said cells at said predefined times.

2. The system of claim 1, wherein said computational mechanism involves no solution to Navier-Stokes-type equations.

3. The system of claim 1, wherein the computational mechanism fluid dynamics properties including the change in height as between pairs of adjacent cells within the array over a given time interval as affected by the contact by the object with the fluid body.

4. A fluid dynamics animation method comprising:
    describing a fluid body as a regular array of fluid cells defined by a memory-based mathematical model, said mathematical model describing the fluid dynamics properties representing flow between each cell and its plural adjacent cells within the array;
    defining an object impinging upon the fluid body as a plurality of pressure vectors within a vector profile representing the impingement of the object thereon;
    calculating the effect on the fluid body by flow between such cells within the mathematical model as influenced by the pressure vectors defining the impinging object; and
    rendering a sequence of picture frames based upon said calculating step that, when displayed in rapid succession give the illusion of fluid motion of the fluid body and the impinging object.

5. The method of claim 4, wherein the impinging object produces wave motion in the fluid body.

6. The method of claim 5, wherein the impinging object impacts the fluid body.

7. The method of claim 5, wherein the impinging object travels along the surface of the fluid body.

8. The method of claim 5, wherein the impinging object produces spray phenomena in the fluid body.

9. The method of claim 4, wherein said calculating step includes no solution to Navier-Stokes-type equations.

10. The method of claim 4 which relies solely on the fluid dynamic principle of static equilibrium as between any two adjacent ones of such cells.

11. The method of claim 4, wherein said describing step defines a mathematical model characterized by fluid dynamics properties including the change in height as between pairs of adjacent cells within the array over a given time interval as affected by the impingement of the object on the fluid body.

12. The method of claim 11, wherein said calculating step produces a height for each cell in the array at the end of a defined time interval and then, as among groups of cells having a common vertex therebetween within the array of cells, produces a height for such common vertex at the end of the defined time interval that represents an average of the calculated heights of the cells within each group.

13. The method of claim 4, wherein said defining and calculating steps are repeated, with interactive input from a user of said method regarding the object and its impingement upon the fluid body, prior to said rendering step.

14. The method of claim 13, wherein said describing, defining and calculating steps produce a wire-frame representation of how the object and the fluid body interact as a result of the impingement of the object on the fluid body, the wire-frame representation simulating the fluid dynamics.

15. The method of claim 14, wherein said rendering step produces a smooth texturing of the object and the fluid body to produce the sequence of frames characterized by realistic physical attributes in the animation.

* * * * *